UNITED STATES PATENT OFFICE.

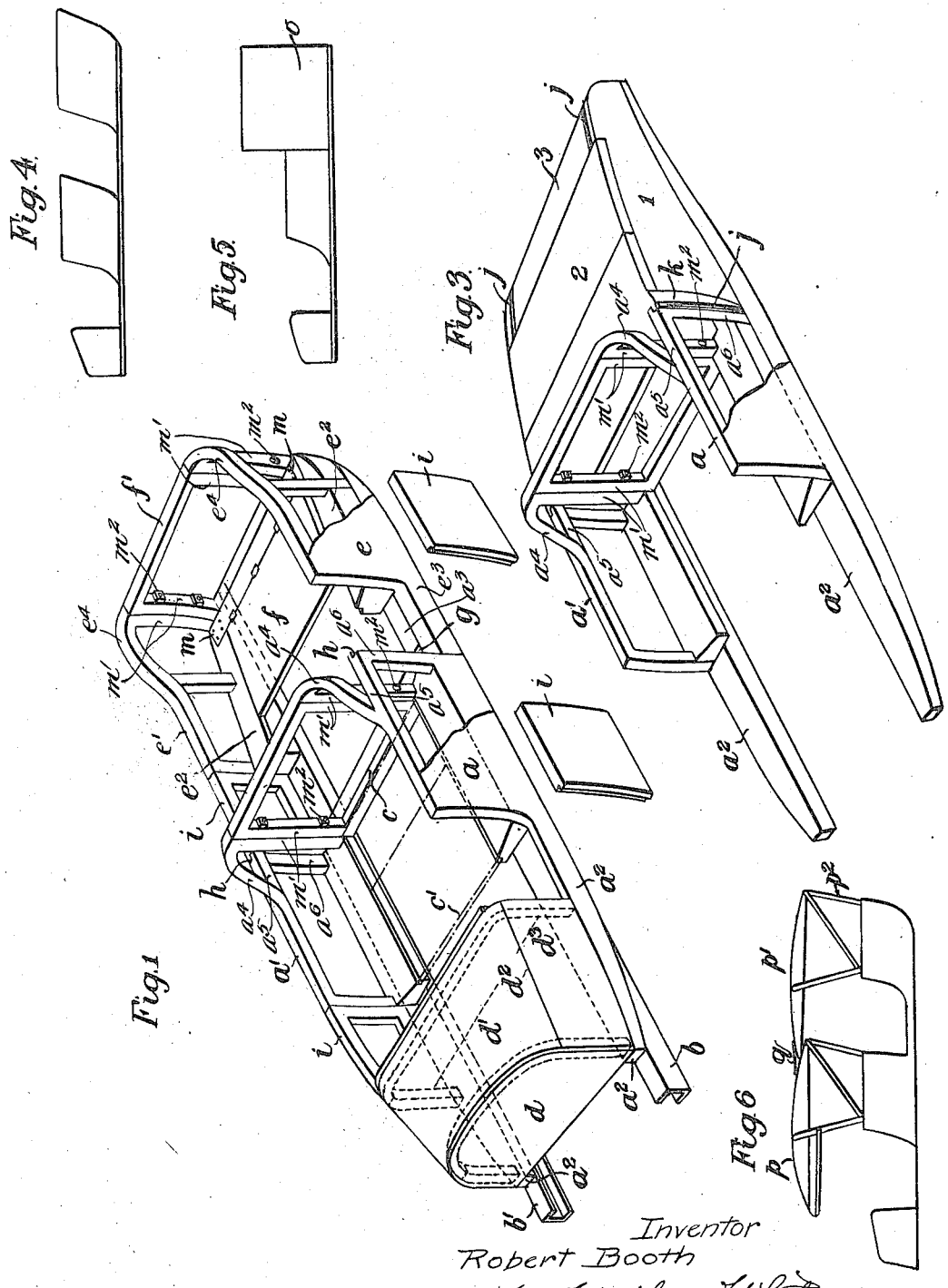

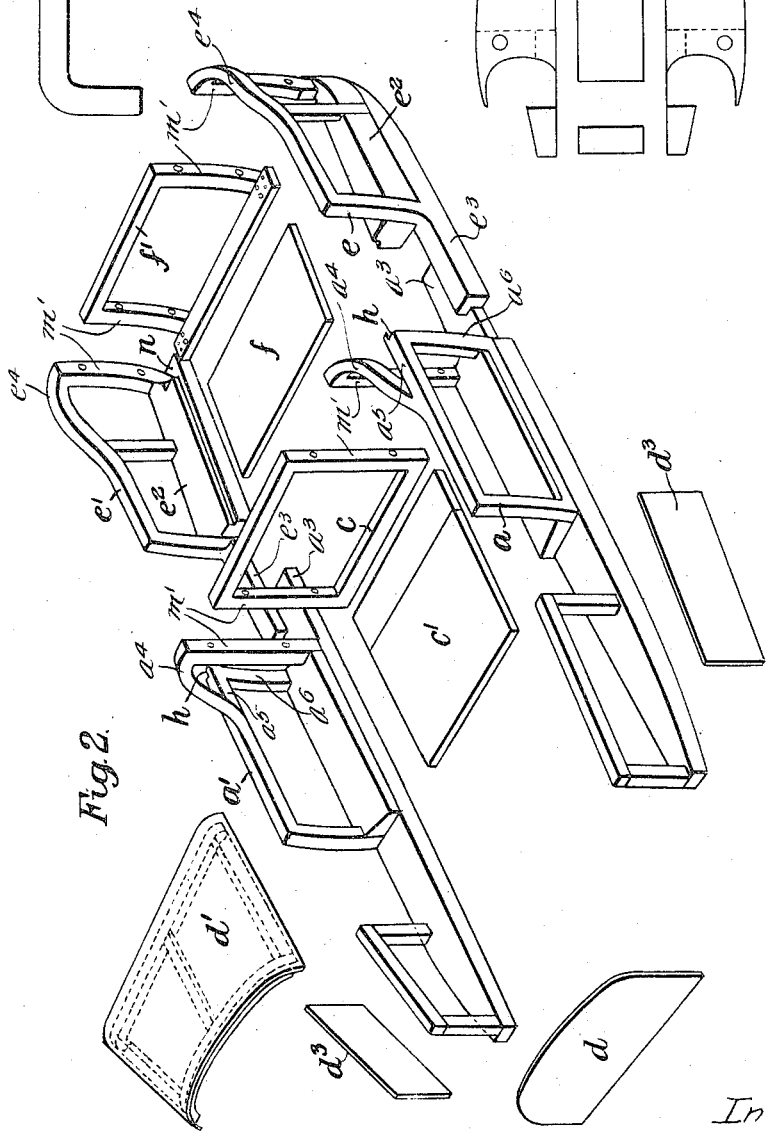

ROBERT BOOTH, OF JOHANNESBURG, TRANSVAAL, SOUTH AFRICA.

MOTOR ROAD-VEHICLE.

1,220,999. Specification of Letters Patent. Patented Mar. 27, 1917.

Application filed March 27, 1916. Serial No. 86,910.

*To all whom it may concern:*

Be it known that I, ROBERT BOOTH, residing at Johannesburg, post-office box 983, Transvaal, South Africa, accountant, subject of the King of Great Britain and Ireland, have invented certain new and useful Improvements in or Relating to Motor Road-Vehicles, of which the following is a specification.

This invention relates to motor road vehicles and has particular reference to the car or body portions of such vehicles, the chief object being to provide a body which is capable of being packed in a small space for reducing freightage when transporting the body, say from one country in which it is made to another in which it is attached to a chassis and has the further advantage of rendering the body readily convertible, for example from a two-seater with tail box into a four-seater, or commercial body.

According to this invention I provide a number of separate sections or panels which for transporting purposes can be packed practically flat against each other to occupy much less space than a built up or complete body, and which can be readily assembled or built up and attached to the chassis by comparatively unskilled labor.

For example:—the sides of the body and seat backs with other transverse members may be separable for transport and provided with means of assembling and fixing them together when the motor body is to be erected for use.

The sections may comprise the two sides of a front two-seater portion mounted on runners for securing the same to the chassis, the seat, seat back and dash sections comprising the transverse members for coupling the side sections together. If required each side section may consist of the sides of both front and rear seats or portions in one section and upon one runner.

The body may consist of a front and a rear portion composed of sections or panels as aforesaid, the front portion which comprises the dash and the front seats being, when assembled, attached to the chassis, while the rear portion comprises suitably shaped sections which when assembled can be readily detached as a whole from the chassis and front portion, so as to be interchangeable with other rear portions; thus the body may be converted from a "four-seater" touring car into a "two-seater" car or a delivery van by merely changing the rear portions of the body. By this arrangement practically three or more different types of bodies can be provided, and owing to the front portion and each of the rear portions being composed of sections the space occupied by them when being transported is less than would be occupied by one single built up or complete body, thereby saving considerably in freightage. I may provide padded backing for the seats of the body which backing may be constructed in the form of a complete and separate article that can be packed with the sections or panels and readily attached to certain of the sections when the latter are built up or assembled. A hood is also provided which can readily be adapted to suit the body either when arranged as a "four-seater" car or when arranged as a "two-seater" car or a delivery van.

In order that the said invention may be clearly understood, and readily carried into effect, I will describe the same more fully with reference to the accompanying drawings, in which:—

Figure 1 is a perspective view showing one construction of the improved body adapted to seat four or more persons.

Fig. 2 is a perspective view showing the various sections or panels of which the body shown in Fig. 1 is composed, separated.

Fig. 3 is a perspective view showing the front portion of Fig. 1 with a tail box substituted for the rear seats.

Fig. 4 is a diagrammatic side elevation indicating how the front and rear seat portions may be embodied in each side section.

Fig. 5 shows in diagram a body such as Fig. 1 converted into delivery van.

Fig. 6 is a diagrammatic view showing the hood adapted for use with the convertible body shown in Figs. 1, 2 and 3, and with the commercial vehicle.

In Fig. 7 is a diagram showing one form of padding.

In the example shown in Figs. 1 to 3 $a$ $a'$ represent the two side sections consisting of the sides of the front seat portion mounted on longitudinal runners $a^2$ $a^2$ which side runners are adapted to be fixed to the side members $b$ $b^1$ of the chassis. $c$ is the transverse section comprising the back of the front seats together with the horizontal seat member $c'$ which seat member may be either separate or hinged to the back and adapted to be fixed in the usual position. The transverse parts of the dash are indicated at $d$ $d'$ the upper part $d'$ being removable on the lines $d^2$ $d^2$. $d^3$ $d^3$ are the longitudinal portions of the dash. $e$ $e'$ are the side sections of the rear seat portion, and $f$ $f'$ are the transverse seat and seat back parts thereof. $e^2$ $e^2$ are the base parts of the rear side portion which base parts are extended longitudinally as at $e^3$, so as to overlap and be fixed to the respective rearward extensions $a^3$ of the runners $a^2$ $a^2$ of the front seat portion and to be fixed also to the chassis $b$ $b'$. The sides $e$ $e'$ of the rear seat portion are separately assembled with the transverse seat and seat back parts $f$ $f'$ as a separate unit adapted to be detachably fixed in position.

The floor, not shown, is made in separate sections and adapted to be placed in position when the body has been or is being erected. Suitable transverse stay members such as $g$ may be provided to give strength to the assembled sections. The doors $i$ will be provided either as separate sections adapted to be hinged upon the sides when being assembled or they may be hinged to and transported with the side sections. It will be seen that the doors of the rear portion make joint with the rear edge of the front portion as at $h$ $h$. The paneling or covering of the framework has been mainly removed from the figures to show the structure more clearly but it will be understood that any type of paneling may be secured to the several sections and will comprise a portion thereof to make the body complete when the sections are assembled.

At the joints of the sections, beadings such as $j$, Fig. 3, may be provided to cover the joints.

Fig. 3 shows how the rear seat portions of Figs. 1 and 2 may be interchangeable with a tail box rear portion. This tail box portion is also in sections comprising side sections 1, 1, top 2, and end portion 3, all detachable so as to be transported in flat or substantially flat sections. Where the front of the tail portion joins the front portion of the body a pillar such as $k$ may be provided with an overlapping bead such as $j$.

In the particular structure shown the transverse seat backs are provided with transverse battens extending beyond the back as at $m$ and fitting into recesses $n$ in the side sections so as to overlap the adjacent vertical batten $m^1$ of the side section, and it will be seen that at all the joints two battens $m^1$ of the joined sections come side by side so as to be secured by bolts, pins or the like $m^2$ passing through both battens, and thereby obtaining a strong and efficient joint.

At the rear corners of the front portion of the body the side sections are turned inward in graceful curves as at $a^4$, so that the said in-turned portions enter the plane of the transverse seat section $c$. In the case of a two-seater, the side sections of the rear body portion are similarly curved at $e^4$.

The side sections of the front body portion also have rearward extensions $a^5$ which are in the planes of the major, forward portions thereof and have door jambs $a^6$ at their rear edges.

The vertical batten $m^1$ of the in-turned portion of either side section does not project inwardly past the inner edge of the underlying runner $a^2$, so the section is substantially flat and can be packed with the other sections in a small space. The surfaces of broad area of adjacent sections will be in close proximity to each other.

The padding and upholstering which are not shown may be fixed to each section as a permanent part thereof, transportable therewith and ready for the assembling of the sections, or the said padding or upholstering may be provided as separate sections or linings adapted to be placed in position when required.

As an example the padding for the seat backs and sides may consist of a case of strip form such as indicated in Fig. 7 which for transport can be laid out flat.

Instead of being built up of wooden battens and the like each section may be built up of bent metal work covered with suitable paneling and further the several sections may be pressed whole out of sheet metal and strengthened by beading or angle irons or the like, the pressed out section being provided with inturned edges or with angle irons which serve the purpose of the battens in permitting the fastening of the several sections of the body together in a strong and efficient manner for use.

Fig. 4 shows diagrammatically how both rear and front portions may be comprised in one section. The tailbox of two seater can be made in one with the front portion, in a similar manner. A van body can be built in the same manner.

Fig. 5 shows how a rear portion in the form of a delivery van $o$ may be substituted for the seats or tail box shown in the other views.

Fig. 6 shows a collapsible hood or cover composed of two top parts $p$ $p'$ which are connected together by suitable clips or fastenings and a rear part $p^2$ connected by suitable clips or fastenings to the part $p'$. When either the tail portion or van portion is substituted for the rear portion shown in Fig. 1, the part $p^1$ of the hood is removed and the rear part $p^2$ is connected to the part $p$ by the clips or fastenings. A flap such as $q$ is provided where the parts of the hood overlap so as to prevent the access of wind and rain to the rear hood.

It will be understood that the various sections or panels of the body may be packed practically flat against each other, and the other parts such as the seats, padded backings, supports, cross bars, floors, etc., can be similarly packed when it is necessary to transport the body. In some cases it may be convenient to hinge the panels together and any suitable means may be adapted to secure the panels in the built up or assembled condition. The invention is equally applicable to side cars or side carrier bodies for use with motor cycles and to ordinary van bodies.

What I claim and desire to secure by Letters Patent is:—

1. A collapsible body for motor vehicles comprising substantially flat sides and transverse seat back and seat bottom sections, the seat back and seat bottom sections lying within the body between the ends thereof, all of said sections being detachably connected together and adapted when disconnected to be packed together in close proximity throughout their broad areas, and longitudinal supporting members underlying corresponding side sections and being independent of each other for packing with said sections.

2. A collapsible body for motor vehicles comprising substantially flat sides and transverse seat back and seat bottom sections, the seat bottom sections lying within the body adjacent the lower portions of the sides, all of said sections being detachably connected together and adapted when disconnected to be packed together in close proximity throughout their broad areas, and longitudinal supporting members underlying corresponding side sections and being independent of each other for packing with said sections.

3. A convertible body for motor vehicles comprising separable front and rear portions, each body portion being collapsible and composed of substantially flat, detachable side and transverse sections adapted when disconnected to be packed together in close proximity throughout their broad areas, longitudinal supporting members underlying corresponding side sections of the front portion of the body and being independent of each other for packing with the said sections, and independent base parts provided on the side sections of the rear body portion and extending longitudinally for connection with the corresponding supporting members of the front body portion in prolongation thereof.

4. A convertible body for motor vehicles comprising separable front and rear portions, each body portion being collapsible and composed of substantially flat, detachable side and transverse sections adapted when disconnected to be packed together in close proximity throughout their broad areas, longitudinal supporting members underlying corresponding side sections of the front portion of the body and being independent of each other for packing with the said sections, and independent base parts provided on the side sections of the rear body portion and extending longitudinally for connection with the corresponding supporting members of the front body portion in prolongation thereof, the said supporting members being provided at their rear ends, and the base parts of the side sections of the rear body portion at their front ends, with extensions adapted to over-lap when the parts are assembled to strengthen the joint between the front and rear body portions.

5. A collapsible body for motor vehicles comprising substantially flat, detachable side and transverse sections adapted when disconnected to be packed together in close proximity throughout their broad areas, said sections including separable side and top dash sections.

6. A collapsible body for motor vehicles comprising substantially flat, detachable side and transverse sections adapted when disconnected to be packed together in close proximity throughout their broad areas, and longitudinal supporting members underlying corresponding side sections and being independent of each other for packing with the said sections, the said transverse sections including a vertical seat back and the rear ends of the side sections situated immediately in front of the said back being turned inward to join the back substantially in the plane of the latter.

7. A collapsible body for motor vehicles comprising substantially flat, detachable side and transverse sections adapted when disconnected to be packed together in close proximity throughout their broad areas, and longitudinal supporting members underlying corresponding side sections and being independent of each other for packing with the said sections, the said transverse sections including a vertical seat back and the rear ends of the side sections situated immediately in front of the said back being turned inward to join the back substantially in the plane of the latter, the in-turned end of each of the said side sections being formed so that it projects from the straight portion of the said section to no greater extent than the width of the underlying supporting member.

8. A collapsible body for motor vehicles comprising substantially flat, detachable side and transverse sections adapted when disconnected to be packed together in close proximity throughout their broad areas, and longitudinal supporting members underlying corresponding side sections and being independent of each other for packing with the said sections, the said transverse sections including a vertical seat back and the rear ends of the side sections situated immediately in front of said back being turned inward to join the back substantially in the plane of the latter, and straight rearward extensions provided upon the said side sections and leading from the position of juncture with the in-turned end portions.

In witness whereof, I have hereunto signed my name in the presence of two subscribing witnesses.

ROBERT BOOTH.

Witnesses:
  HENRY ALLEN PRYOR,
  ALFRED BEESLEY CAMPBELL.